(12) United States Patent
Jenkins

(10) Patent No.: US 6,502,478 B2
(45) Date of Patent: Jan. 7, 2003

(54) MOUNT SYSTEM

(76) Inventor: Stephen S. Jenkins, 2716 Maple Street, Fenwick, Ontario (CA), L0S 1C0

( * ) Notice: Subject to any disclaimer, the term of this patent is extended or adjusted under 35 U.S.C. 154(b) by 63 days.

(21) Appl. No.: 09/802,011

(22) Filed: Mar. 9, 2001

(65) Prior Publication Data

US 2001/0009117 A1 Jul. 26, 2001

Related U.S. Application Data

(63) Continuation-in-part of application No. 09/272,812, filed on Dec. 3, 1998, which is a continuation-in-part of application No. 08/390,868, filed on Feb. 17, 1995, now abandoned.

(51) Int. Cl.$^7$ .............................................. B62K 21/12
(52) U.S. Cl. ..................................... 74/551.1; 74/551.8
(58) Field of Search ............................ 74/555.1, 551.3, 74/551.4, 551.5, 551.6, 551.7, 551.8; 280/288.4

(56) References Cited

U.S. PATENT DOCUMENTS

| | | | | |
|---|---|---|---|---|
| 515,622 A | * | 2/1894 | Steen ........................ 224/428 |
| 578,027 A | * | 3/1897 | Rogers .................... 280/288.4 |
| 586,307 A | * | 7/1897 | Dickson ...................... 403/96 |
| 588,881 A | * | 8/1897 | Roberts ................... 280/288.4 |
| 626,736 A | * | 6/1899 | Taulbee ...................... 280/290 |
| 632,099 A | * | 8/1899 | Carloni ....................... 280/270 |
| 3,789,634 A | * | 2/1974 | Brown ......................... 70/186 |
| 4,068,858 A | * | 1/1978 | Harrison et al. ........... 280/279 |
| 4,322,087 A | * | 3/1982 | Addicks ..................... 280/279 |
| 4,337,962 A | * | 7/1982 | Allen et al. ................. 280/279 |
| 5,145,210 A | * | 9/1992 | Lennon ...................... 280/261 |
| 5,195,394 A | * | 3/1993 | Latta ....................... 280/288.4 |
| 5,273,302 A | * | 12/1993 | Ureel .......................... 280/279 |
| 5,319,993 A | * | 6/1994 | Chiang ....................... 280/279 |
| 5,327,798 A | * | 7/1994 | Lerch, Jr. ................... 292/137 |
| 5,687,616 A | * | 11/1997 | Marui ......................... 280/279 |
| 6,167,780 B1 | * | 1/2001 | Chen ......................... 74/551.1 |
| 6,186,027 B1 | * | 2/2001 | Nielsen ....................... 403/365 |

FOREIGN PATENT DOCUMENTS

| | | | |
|---|---|---|---|
| CH | 285978 | * | 1/1953 |
| DE | 823988 | * | 12/1951 |
| FR | 794122 | * | 2/1936 |
| FR | 7616429 | * | 12/1977 |
| GB | 25850 | * | of 1905 |
| GB | 2264678 A | * | 9/1993 |

\* cited by examiner

*Primary Examiner*—Christopher P. Schwartz
*Assistant Examiner*—Xuan Lan Nguyen

(57) ABSTRACT

A Mount System provides a strong mount for reliable direct connection of attachments to the steering of a bicycle. The mount is connected to the steering of a bicycle next to the steering bearings the strongest location. The Mount System includes a plurality of fittings for the direct connection of a plurality of attachments.

5 Claims, 1 Drawing Sheet

MOUNT SYSTEM

Specific Reference to earlier filed application—This is a Continuation-in-Part of CIP application Ser. No. 09/272,812 entitled STEERING MOUNT SYSTEM filed Dec. 3, 1998 in the United States, which is a CIP of application Ser. No. 08/390,868 filed Feb. 17, 1995 now abandoned in the United States, all by the same inventor. Stephen S. Jenkins, and has the same effect and scope as the prior applications subject to subsequent amendments and additions.

FIELD OF THE INVENTION

This invention relates to bicycle steering devices.

BACKGROUND OF THE INVENTION

Related prior art structures generally are designed to clamp on to ordinary steering members that are not designed to withstand the added stress and leverage. This can result in metal fatigue and failure without warning, resulting in loss of control and injury. To avoid this, the sturdy present invention is designed for anticipated stress. It connects to bicycle steering directly, rather than being clamped on. It connects next to steering bearings, which is the strongest location. A novel feature is that it includes a plurality of fittings for direct connection of a plurality of attachments.

SUMMARY OF THE INVENTION

The Object of Invention is to provide a safe sturdy mount, with a plurality of fittings to directly connect and control many attachments. The mount connects directly to bicycle steering next to steering bearings for the greatest strength Attachments include any combination of: a handlebar, an adjustable handlebar, a carrier, a brake control, a shift control, arm supports, electronic devices, mirror, storage, and common accessories.

DESCRIPTION

Figures 1A, 1B, 1C:
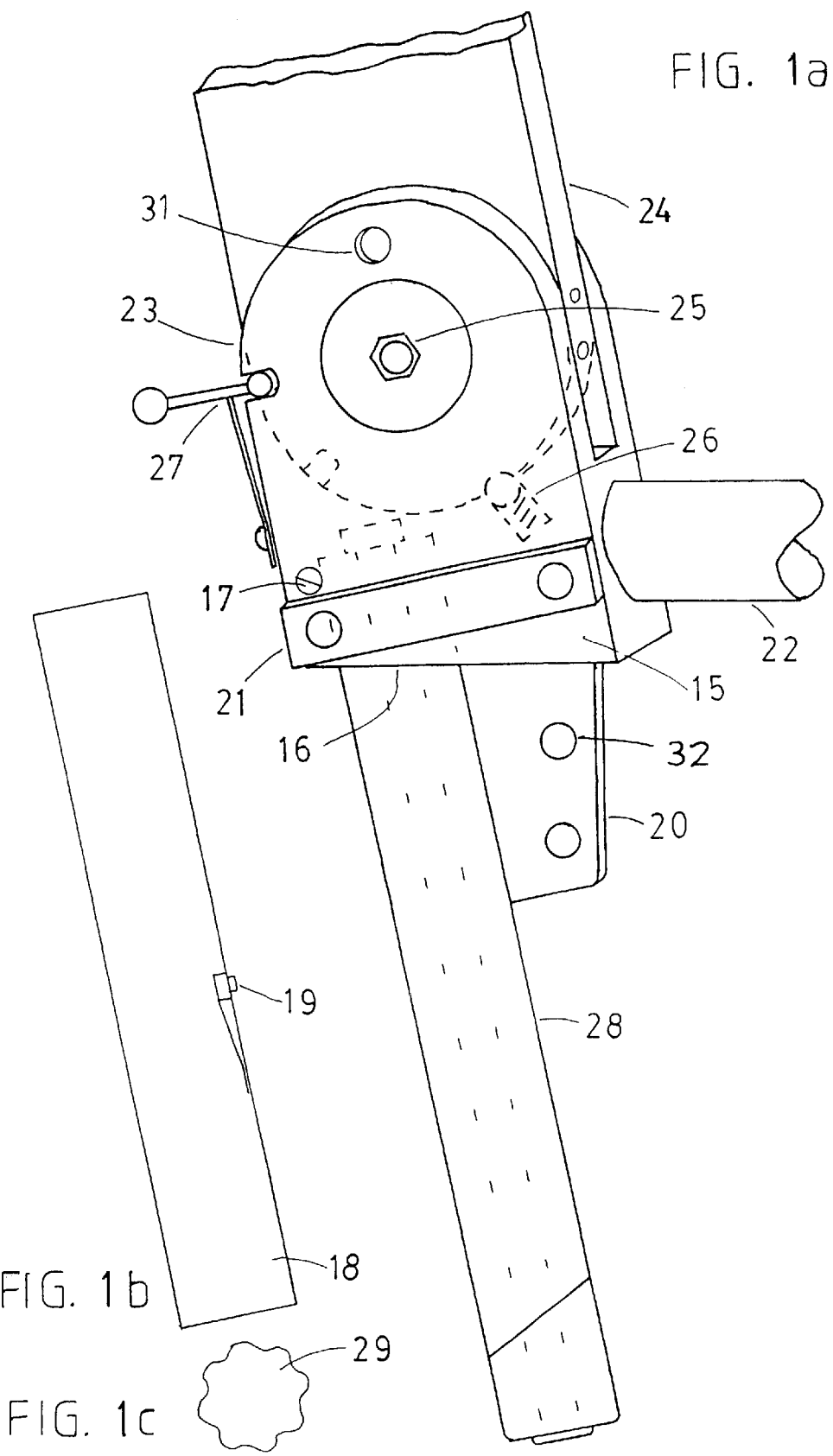
FIG. 1a shows a perspective elevation view of best mode of Mount System.
FIG. 1b shows a cross-section elevation view of a second embodiment of a mount fitting adapter device, and a locating pin device.
FIG. 1c shows a plan view of, third embodiment of a mount fitting adapter device with undulated shape.

FIG. 1a shows mount 15 with first embodiment of a mount fitting adapter device 28 connected to mount fitting 16 in the inferior portion of mount 15, secured by securing device 17. Gusset fitting 20, connected to upper portion of first embodiment of a mount fining adapter device 28 reinforces connection to mount 15; and gusset fitting 20 includes mounting device 32 for connecting attachments, including a carrier. Lateral fitting 21, connected to lateral portion of mount 15, includes openings for connecting attachments, including an electronic device. Anterior fitting 22, connected to the anterior portion of mount 15, includes an extension for connecting attachments, including a steering device. Superior fining 23, connected to the superior portion of mount 15, includes two lugs with space between for attachment 24 to pivot on axle 25, and includes detent 26 to control pivoting positions of attachment 24, including an adjustable steering device. Locking device 27, connected to posterior portion of mount 15, controls pivoting positions of attachment 24. Socket fitting 31, connected to superior portion of mount 15, connects attachments, including a storage device.

FIG. 1b shows second embodiment of a mount fitting adapter device 18, having a tubular shape; and shows locating pin device 19, connected to the interior, piercing the tubular shape.

FIG. 1c shows third embodiment of a mount fitting adapter device 29 having undulated tubular shape.

OPERATION AND FUNCTION

FIG. 1a shows the best mode of the MOUNT SYSTEM. Mount 15 is designed for maximum strength while efficient in size and weight, and includes a novel array of fittings tat are strong enough to directly connect many attachments in safety and reliability, Mount fitting 16 securely connects mount 15 directly to the steering of a bicycle, right next to steering bearings—the strongest location. Mount fitting 16 securely connects to first embodiment of a mount fitting adapter device 28, suited for connecting inside a steered tube of a bicycle steering. Gusset fitting 20, connected to first embodiment of a mount fitting adapter device 28, strengthens connection to mount 15. Securing device 17, in combination with mount fitting 16, holds first embodiment of a mount fitting adapter device 28 securely. FIG. 1b shows second embodiment of a mount fitting adapter device 18 which connects inside a steerer tube of a bicycle steering, and is located in position in combination with locating pin device 19. FIG. 1c shows third embodiment of a mount fitting adapter device 29, which includes undulated tubular Shape to permit a tighter fit inside a steerer tube of a bicycle steering, and gives added strength. FIG. 1a shows lateral fitting 21 for connecting attachments including electronic devices such as an electronic speedometer. Anterior fitting 22 connects to attachments, including a steering device such as a handlebar for steering. Superior fining 23 connects to attachments, including attachment 24 which pivots on axle 25 to provide a range of positions that are controlled in combination with detent device 26 and in combination with locking device 27. Attachment 24, including an adjustable steering device, is controlled in an upright position for operating a bicycle while erect, and controlled in a forward position for operating a bicycle while leaning forward.

To change from upright position to forward position, or any position between, an operator pulls back on spring loaded locking device 27, thereby releasing it, and then pivoting attachment 24 to another position as located by detent device 26. Socket fitting 31 connects attachments, including a storage device. When a bicycle operator wishes to store the bicycle on a storage device, including a bicycle rack, socket fitting 31 provides a reliable connection.

CONCLUSIONS

A Mount System is a novel invention to fill a need for a strong reliable mount for directly connecting a useful bicycle attachment at the strongest location on bicycle steering. Additionally, the Mount System includes a novel plurality of fittings for the direct connection of a plurality of attachments.

Of course claims define scope; and elements of this disclosure include all the undisclosed details that complete the inherent function of those elements.

REFERENCE LIST

15—MOUNT
16—MOUNT PITTING

17—SECURING DEVICE
18—SECOND EMBODIMENT OF A MOUNT FITTING ADAPTER DEVICE
19—LOCATING PIN DEVICE
20—GUSSET FITTING
21—LATERAL FITTING
22—ANTERIOR FITTING
23—SUPERIOR FITTING
24—ATTACHMENT
25—AXLE
26—DETENT DEVICE
27—LOCKING DEVICE
28—FIRST EMBODIMENT OF A MOUNT FITTING ADAPTER DEVICE
29—THIRD EMBODIMENT OF A MOUNT FITTING ADAPTER DEVICE
31—SOCKET FITTING
32—MOUNTING DEVICE

I claim:

1. A mount system for a steering of a bicycle comprising:
   a mount, substantially rectangular in shape, including an inferior portion, an anterior portion, a lateral portion, a superior portion, and a posterior portion;
   a mount fitting in said inferior portion of said mount for directly connecting said mount to said steering;
   a mount fitting adapter device for directly connecting said mount fitting to said steering, for a bicycle that requires said mount fitting adapter device;
   an anterior fitting directly connected to said anterior portion of said mount for directly connecting an attachment, including a steering device in combination with said anterior fitting for controlling said steering;
   a lateral fitting directly connected to said lateral portion of said mount for directly connecting another attachment including an electronic device;
   a superior fitting directly connected to said superior portion of said mount for directly connecting an additional attachment including an adjustable steering device;
   a locking device directly connected to said posterior portion of said mount in combination with said mount for controlling said additional attachment;
   a socket fitting directly connected to said superior portion of said mount for directly connecting a further attachment.

2. A mount system according to claim 1 wherein said superior fitting of said mount includes:
   lugs with space between for said additional attachment;
   an axle for pivoting said additional attachment;
   a detent device, in combination with said superior fitting, for controlling said additional attachment.

3. A mount system according to claim 1 wherein said mount fitting adapter device includes:
   a gusset fitting, directly connected to the superior portion of said mount fitting adapter device and directly connected to the inferior portion of said mount, for directly connecting a gusset attachment including a carrier;
   a securing device, in combination with said mount fitting, for securing said mount fitting adapter device to the inferior portion of said mount.

4. A mount system according to claim 1 including:
   a locating pin device in combination with said mount fitting adapter device for directly connecting to said steering.

5. A mount system according to claim 1 including:
   said mount fitting adapter device having undulated wall.

* * * * *